(12) United States Patent
Barker

(10) Patent No.: US 9,608,269 B2
(45) Date of Patent: Mar. 28, 2017

(54) CONDENSED POLYANION ELECTRODE

(71) Applicant: FARADION LTD., Sheffield (GB)

(72) Inventor: Jeremy Barker, Oxfordshire (GB)

(73) Assignee: FARADION LTD. (GB)

( * ) Notice: Subject to any disclaimer, the term of this patent is extended or adjusted under 35 U.S.C. 154(b) by 308 days.

(21) Appl. No.: 14/348,485

(22) PCT Filed: Sep. 25, 2012

(86) PCT No.: PCT/GB2012/052363
§ 371 (c)(1),
(2) Date: Mar. 28, 2014

(87) PCT Pub. No.: WO2013/045905
PCT Pub. Date: Apr. 4, 2013

(65) Prior Publication Data
US 2015/0030929 A1    Jan. 29, 2015

(30) Foreign Application Priority Data

Sep. 30, 2011    (GB) .................................. 1116877.0

(51) Int. Cl.
| | |
|---|---|
| *H01M 4/58* | (2010.01) |
| *C01B 25/42* | (2006.01) |
| *H01B 1/08* | (2006.01) |
| *C01B 25/38* | (2006.01) |
| *C01G 45/00* | (2006.01) |

(Continued)

(52) U.S. Cl.
CPC ........... *H01M 4/5825* (2013.01); *C01B 25/38* (2013.01); *C01B 25/42* (2013.01); *C01G 45/006* (2013.01); *C01G 51/006* (2013.01); *C01G 53/006* (2013.01); *H01B 1/08* (2013.01); *H01M 10/054* (2013.01); *H01M 2220/30* (2013.01)

(58) Field of Classification Search
None
See application file for complete search history.

(56) References Cited

U.S. PATENT DOCUMENTS

| | | |
|---|---|---|
| 6,872,492 B2 | 3/2005 | Barker et al. |
| 2004/0206938 A1 | 10/2004 | Barker et al. |

(Continued)

FOREIGN PATENT DOCUMENTS

| | | |
|---|---|---|
| CN | 103765640 A | 4/2014 |
| EP | 1544930 A2 | 6/2005 |

(Continued)

OTHER PUBLICATIONS

Second Office Action with English Translation dated Mar. 18, 2016 issued in Chinese Patent Application No. 201280047816.9, pp. 1-15.

(Continued)

*Primary Examiner* — Scott J Chmielecki
(74) *Attorney, Agent, or Firm* — Tram Anh Nguyen

(57) ABSTRACT

The invention relates to electrodes that contain active materials of the formula: $Na_aX_bM_cM'_d(condensed\ polyanion)_e(anion)_f$; where X is one or more of Na+, Li+ and K+; M is one or more transition metals; M' is one or more non-transition metals; and where $a>b$; $c>0$; $d≥0$; $e≥1$ and $f≥0$. Such electrodes are useful in, for example, sodium ion battery applications.

17 Claims, 10 Drawing Sheets

(51) Int. Cl.
*C01G 51/00* (2006.01)
*C01G 53/00* (2006.01)
*H01M 10/054* (2010.01)

(56) References Cited

U.S. PATENT DOCUMENTS

| | | | |
|---|---|---|---|
| 2005/0136331 A1* | 6/2005 | Jouanneau-Si Larbi | H01M 4/131 429/231.95 |
| 2010/0028580 A1* | 2/2010 | Palmer | C08G 69/265 428/36.9 |
| 2010/0039690 A1* | 2/2010 | Agrawal | G02F 1/15 359/265 |
| 2012/0183868 A1* | 7/2012 | Toussaint | H01M 6/185 429/403 |

FOREIGN PATENT DOCUMENTS

| | | |
|---|---|---|
| EP | 2239805 A1 | 10/2010 |
| EP | 2752925 A1 | 7/2014 |
| JP | 2006523930 A | 10/2006 |
| WO | 2011/078197 A1 | 6/2011 |
| WO | 2012024001 A1 | 2/2012 |
| WO | 2013031331 A1 | 3/2013 |
| WO | 2013032555 A1 | 3/2013 |

OTHER PUBLICATIONS

First Office Action with English Translation dated Jul. 20, 2015 issued in Chinese Patent Application No. 201280047816.9, pp. 1-15.

Sanz, F. et al. Synthesis, Structural Characterization, Magnetic Properties, and Ionic Conductivity of Na4MII3(PO4)2 (P2O7) (MII=Mn, Co. Ni). Chem. Mater., (2001) 13: 1334-1340.

Essehli, et al., "Synthesis, crystal structure and infrared spectroscopy of a new non-centrosymmetric mixed-anion phosphate Na4Mg3 (P04) 2 (P2O7)", Journal of Alloys and Compounds, vol. 493, No. 1-2, Mar. 18, 2010, pp. 654-660.

Francisca, et al., "Crystal Structure, Magnetic Properties, and Ionic Conductivity of a New Mixed-Anion Phosphate Na 4 Ni 5 (P04) 2 (P2O7) 2", Chemistry of Materials, vol. 11, No. 10, Oct. 1, 1999, pp. 2673-2679.

Khiem, et al., "A Layered Iron (III) Phosphate Phase, Na 3 Fe 3 (P04) 4: Synthesis, Structure, and Electrochemical Properties as Positive Electrode in Sodium Batteries", Journal of Physical Chemistry C, vol. 114, No. 21, Jun. 3, 2010, pp. 10034-10044.

Uebou, et al., "Electrochemical insertion of lithium and sodium into (MoO2) 2P2O7", Journal of Power Sources, vol. 115, No. 1, Mar. 27, 2003, pp. 119-124.

Hyungsub, et al., "New Iron-Based Mixed-Polyanion Cathodes for Lithium and Sodium Rechargeable Batteries: Combined First Principals Calculations and Experimental Study", Journal of American Chemical Society, vol. 134, No. 25, Jun. 27, 2012, pp. 10369-10372.

Barpanda et al., "High-voltage Pyrophosphate Cathodes", Advanced Energy Materials, vol. 2, No. 7, May 14, 2012, pp. 841-859.

Search Report for GB Appl. No. 1116877.0 dated Nov. 16, 2012.

Dridi, et al., "Structure and Na+ ion conductivity inside double phosphates of Na8-2xM2 + (P2O7)4 formulation (M= Mn, Co, and Ni)", Solid State Ionics, vol. 107, pp. 25-30, 1998.

DRIDI, et al., Influence of the crystalline or glassy state on the electrical properties of double phosphates of Na8-2xM2 + (P2O7)4 formulation (M=Mg, Mn, Co, Ni), Solid State Ionics, vol. 110, pp. 131-136—1998.

International Search Report and Written Opinion for PCT/GB2012/ 052363 mailed Jan. 28, 2013, 11 pages.

Rochere, et al, "Crystal structure and cation of transport properties of the ortho-diphosphates Na7 (MP2O7) 4PO4 (M = Al, Cr, Fe)", Materials Research Bulletin, vol. 20, pp. 27-34, 1985.

Japanese Office Action dated Aug. 2, 2016, pp. 1-7, including translation.

European Office Action for GB Application No. 12769157.4 mailed Apr. 24, 2015, 6 pages.

* cited by examiner

CONDENSED POLYANION ELECTRODE

CROSS-REFERENCE TO RELATED APPLICATIONS

This application is a United States national phase application under 35 U.S.C. §371 of International Patent Application No. PCT/GB2012/052363 filed on Sep. 25, 2012 , and claims the benefit of Great Britain Patent Application No. 1116877.0 filed on Sep. 30, 2011 , both of which are herein incorporated in their entirety by reference. The International Application was published as International Publication No. WO 2013/045905 on Apr. 4, 2013 .

FIELD OF THE INVENTION

The present invention relates to electrodes that contain an active material comprising condensed polyanion materials, and to the use of such electrodes, for example in sodium ion battery applications. The invention also relates to certain novel materials and to the use of these materials, for example as an electrode material.

BACKGROUND OF THE INVENTION

Sodium-ion batteries are analogous in many ways to the lithium-ion batteries that are in common use today; they are both reusable secondary batteries that comprise an anode (negative electrode), a cathode (positive electrode) and an electrolyte material, both are capable of storing energy, and they both charge and discharge via a similar reaction mechanism. When a sodium-ion (or lithium-ion battery) is charging, $Na^+$ (or $Li^+$) ions de-intercalate and migrate towards the anode. Meanwhile charge balancing electrons pass from the cathode through the external circuit containing the charger and into the anode of the battery. During discharge the same process occurs but in the opposite direction. Once a circuit is completed electrons pass back from the anode to the cathode and the $Na^+$ (or $L^+$) ions travel back to the cathode.

Lithium-ion battery technology has enjoyed a lot of attention in recent years and provides the preferred portable battery for most electronic devices in use today; however lithium is not a cheap metal to source and is too expensive for use in large scale applications. By contrast sodium-ion battery technology is still in its relative infancy but is seen as advantageous; sodium is much more abundant than lithium and researchers predict this will provide a cheaper and more durable way to store energy into the future, particularly for large scale applications such as storing energy on the electrical grid. Nevertheless a lot of work has yet to be done before sodium-ion batteries are a commercial reality.

From the prior art, it is known, for example from patent application WO201 1078197 ,to prepare sodium-ion batteries containing an electrode active material comprising a mixture of a transition metal sodium phosphate and a powder of a composite metal oxide. Similarly, EP2239805 discloses electrodes comprising sodium mixed transition metal oxides, and U.S. Pat. No. 6,872,492 teaches a sodium-ion battery comprising an electrode active material comprising $A_a M_b (XY_4) c Z_d$ where A is sodium, M is one or more metals comprising one metal capable of undergoing oxidation to a higher valance state, $XY_4$ is a phosphate or similar group and z is OH or halogen.

SUMMARY OF THE INVENTION

In a first aspect, the present invention aims to provide a cost effective electrode that contains an active material that is straightforward to manufacture and easy to handle and store. A further object of the present invention is to provide an electrode that has a high initial charge capacity and which is capable of being recharged multiple times without significant loss in charge capacity.

Therefore, the present invention provides an electrode that contains an active material comprising:
$Na_a X_b M_c M'_d$(condensed polyanion)$_e$(anion)$_f$;
where X is one or more of $Na^+$, $Li^+$ and $K^+$;
M is one or more transition metals; M' is one or more non-transition metals;
and where a>b; c>0; d≥0; e≥1 and f≥0.

In particular, the present invention provides an electrode as described above in which the active material comprises a transition metal selected from one or more of titanium, vanadium, niobium, tantalum, hafnium, chromium, molybdenum, tungsten, manganese, iron, osmium, cobalt, nickel, palladium, platinum, copper, silver, gold, zinc and cadmium; an optional non-transition metal selected from one or more of magnesium, calcium, beryllium, strontium, barium aluminium and boron; a condensed polyanion that comprises one or more of titanium, vanadium, chromium, molybdenum, tungsten, manganese, aluminium, boron, carbon, silicon, phosphorus, oxygen, sulfur, fluorine, chlorine, bromine and iodine; and an optional anion that may comprise one or more of halide, hydroxide, borate, nitrate, silicate, arsenate, sulfate, vanadate, niobate, molybdate, tungstate, phosphate, carbonate, fluorophosphate, and fluorosulfate.

In a particularly advantageous electrode of the present invention, the condensed polyanion comprises one or more of phosphorus, boron, titanium, vanadium, molybdenum, and sulfur.

Further, when a further anion is used, mono- (or sometimes call ortho-) phosphate $(PO_4)^{3-}$ is especially preferred. Mono-phosphates are derived from $H_3PO_4$ acid and the $(PO_4)^{3-}$ group is characterised by the presence of a central phosphorus atom surrounded by four oxygen atoms each located at the corners of a regular tetrahedron.

Particularly advantageous electrodes of the present invention employ a mixed phase material comprising $Na^+$ and one or more of $Li^+$ and $K^+$. Alternatively the active material is such that b=0.

A condensed polyanion is a negatively charged species formed by the condensation of two or more simple anions. The species have structures that are mainly octahedral or tetrahedral or, sometimes, a mixture of both octahedral and tetrahedral. Condensed polyanions are characterised by containing two or more central atoms which may either be the same or different from one another to give homopolyanions (iso-condensed polyanions) or hetero-condensed polyanions (mixed polyanions), respectively. The central atoms may comprise one or more of titanium, vanadium, chromium, molybdenum, tungsten, manganese, aluminium, boron, carbon, silicon, nitrogen and phosphorus. Examples of such hetero-condensed polyanions include: $V_2W_4O_{19}^{4-}$, $NiMo_2O_8^{2-}$, $CoMo_2O_8^{2-}$ and $MnMo_2O_8^{2-}$.

One or more dependent ligands are bound the central atoms, and these ligands may be selected from one or more of oxygen, hydroxide, sulfur, fluorine, chlorine, bromine and iodine. Not all of the dependent ligands attached to the central atom need to be the same, thus iso-ligand condensed polyanions (in which the ligands are all the same) and hetero-ligand condensed polyanions (in which the ligands are not all the same) are possible. In a preferred hetero-ligand condensed polyanion, one or more of the ligands comprise one or more halide atoms; fluorine, bromine, iodine and chlorine, and in a further preferred hetero-ligand condensed polyanion, one or more of the ligands comprise oxygen and one or more of the other ligands comprise a halogen, for example: $Mn_2F_6(P_2O_7)^{4-}$.

A particularly preferred electrode according to the invention employs one or more condensed polyanions that comprise at least one of phosphorous, boron, titanium, vanadium, molybdenum, and sulfur. Moreover, electrodes containing an active material comprising a condensed polyanion based on phosphorous are particularly advantageous, especially those which comprise one or more phosphorus moieties selected from $P_2O_7^{4-}$, $P_3O_9^{5-}$ and $P_4On^{6-}$. Such condensed phosphate polyanions are anionic entities built from corner sharing $PO_4$ tetrahedra; the O/P ratio in the anion is $5/2<O/P<4$. However, condensed phosphate moieties are not to be confused with oxyphosphates which include in their atomic structure some oxygen atoms that do not belong in the anionic entity. In all cases known to date, the oxyphosphate anion is characterised by the ratio $O/P>4$.

Examples of preferred active materials used in the electrode of the present invention include:
  i) $Na_aX_bM'_dP_2O_7(PO_4)_2$
    where $a>b$; $a+b=4$; $c+d=3$, and each of the metals represented by M and M' has an oxidation state of +2;
  ii) $Na_aX_bM_cM'_d(P_2O_7)_4(PO_4)$
    where $a>b$; $a+b=7$; $c+d=4$, and each of the metals represented by M and M' has an oxidation state of +3;
  ii) $Na_aX_bM_cM'_d(P_2O_7)_4$
    where $a>b$; $a+b=6$; $c+d=5$, and each of the metals represented by M and M' has an oxidation state of +2;
  iv) $Na_aX_bM_cM'_d(P_2O_7)_4$
    where $a>b$; $a+b=(8-2z)$; $c+d=(4+z)$ where $0<z<1$, and each of the metals represented by M and M' has an oxidation state of +2;
  v) $Na_aX_bM_cM'_dP_2O_7$
    where $a>b$; $a+b=2$; $c+d=1$ and each of the metals represented by M and M' has an oxidation state of +2;
  vi) $Na_aX_bM_cM'_d(P_2O_7)_2(PO_4)_2$
    where $a>b$; $a+b=4$; $c+d=5$ and each of the metals represented by M and M' has an oxidation state of +2; and
  vii) $Na_aX_bM_cM'_d(P_2O_7)_4$
    where $a>b$; $a+b=7$; $c+d=3$ and each of the metals represented by M and M' has an oxidation state of +3
  viii) $Na_aX_bM_cM'_dP_2O_7(PO_4)_2$
    where $a>b$; $a+b=4$; $c+d=3$; wherein $M_c$ comprises one or more transition metals, and preferably $M_c$ comprises iron as $Fe^{2+}$;
  ix) $Na_aX_bM_cM'_d(P_2O_7)_2(PO_4)_2$
    where $a>b$; $a+b=4$; $c+d=5$; $M_c$ comprises one or more transition metals, and preferably $M_c$ comprises iron as $Fe^{2+}$;
  x) $Na_6M_cM'd(P_2O_7)_5$
    where $c>0$; $c+d=7$ and M and M' have an oxidation state of +2;
  xi) $NaMP_2O_7$
    where M is a transition metal with an oxidation state of +3;
  xii) $Na_2Mn_3(P_2O_7)_2$; and
  xiii) $Na_4Mn_2F_6(P_2O_7)$.

In all cases, M and M' are transition metals and non-transition metals respectively, as described above.

Electrodes according to the present invention are suitable for use in many different applications, for example energy storage devices, rechargeable batteries, electrochemical devices and electrochromic devices. Advantageously, the electrodes according to the invention are used in conjunction with a counter electrode and one or more electrolyte materials. The electrolyte materials may be any conventional or known materials and may comprise either aqueous electrolyte(s) or non-aqueous electrolyte(s) or mixtures thereof.

The active materials of the present invention may be prepared using any known and/or convenient method. For example, the precursor materials may be heated in a furnace so as to facilitate a solid state reaction process. Further, the conversion of a sodium-ion rich material to a lithium-ion rich material may be effected using an ion exchange process. Typical ways to achieve Na to Li ion exchange include:

1. Mixing the sodium-ion rich material with an excess of a lithium-ion material e.g. $LiNO_3$, heating to above the melting point of $LiNO_3$ (264° C.), cooling and then washing to remove the excess $LiNO_3$;

2. Treating the Na-ion rich material with an aqueous solution of lithium salts, for example 1 M LiCl in water; and 3. Treating the Na-ion rich material with a non-aqueous solution of lithium salts, for example LiBr in one or more aliphatic alcohols such as hexanol, propanol etc.

BRIEF DESCRIPTION OF THE DRAWINGS

The present invention will now be described with reference to the following drawings in which.

DETAILED DESCRIPTION

Figure 1:
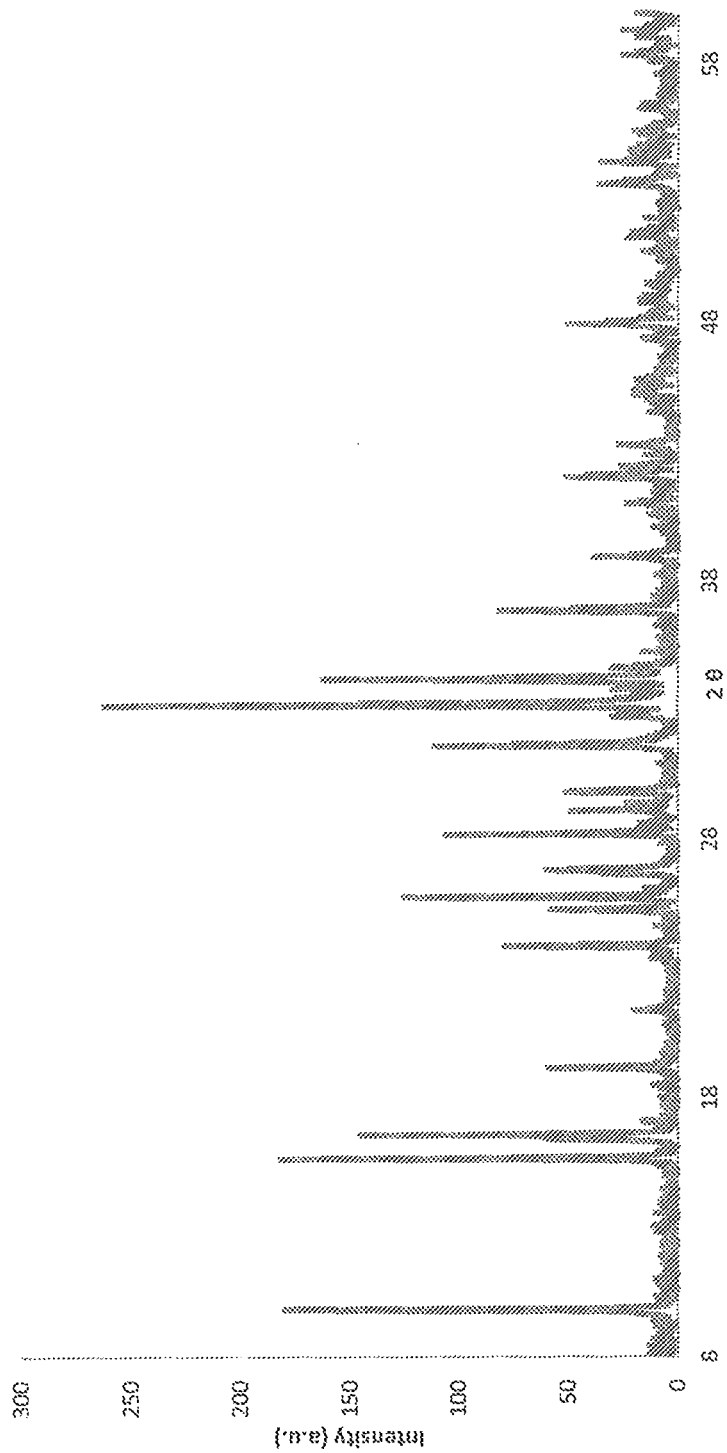
FIG. 1 is an XRD pattern for $Na_4Mn_3(P_2O_7)(PO_4)_2$ prepared according to Example 4c.
Figure 2:
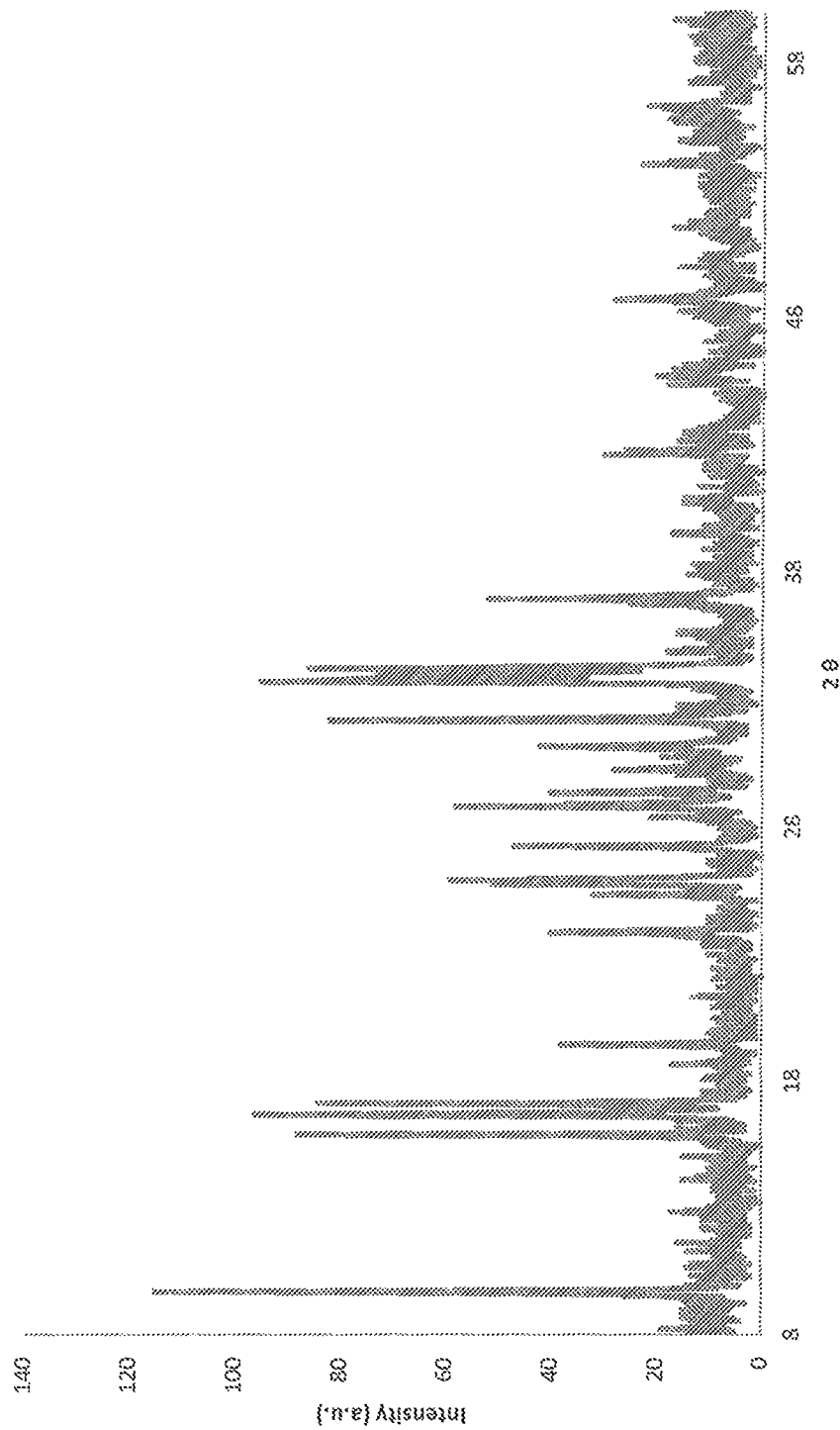
FIG. 2 is an XRD pattern for $Na_4Co_3(PO_4)_2(P_2O_7)$ prepared according to Example 5c.
Figure 3:
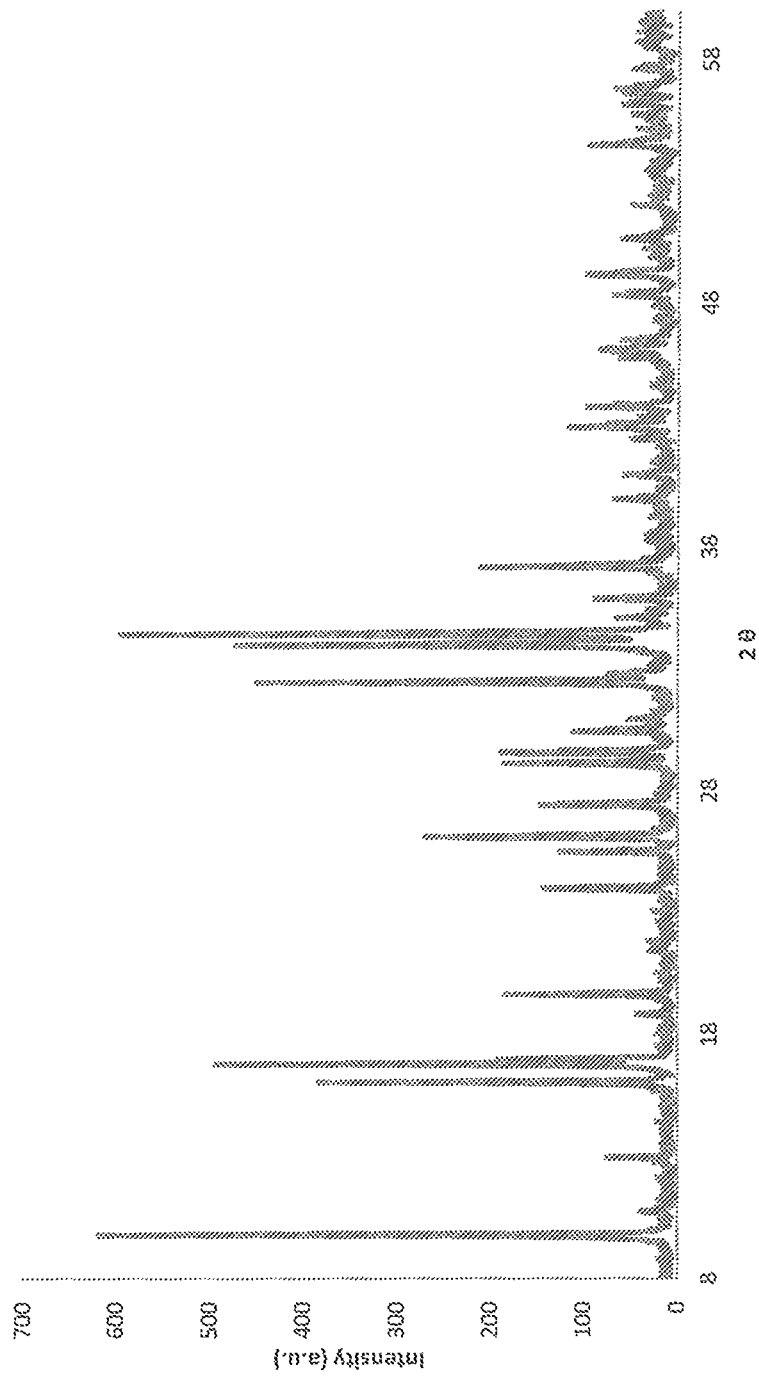
FIG. 3 is an XRD pattern for $Na_4Ni_3(PO_4)_2(P_2O_7)$ prepared according to Example 6c.

Active materials used in the present invention are prepared on a laboratory scale using the following generic method:

Generic Synthesis Method:

The required amounts of the precursor materials are intimately mixed together and then the resulting precursor mixture is pelletized using a hydraulic press. The pelletized material is then heated in a tube furnace or a chamber furnace using either a flowing inert atmosphere (e.g. argon or nitrogen) or an ambient air atmosphere, at a furnace temperature of between about 500° C. to about 1000° C. until reaction product forms, as determined by X-ray diffraction spectroscopy. When cool, the reaction product is removed from the furnace and ground into a powder.

Using the above method, active materials used in the present invention were prepared as summarised below in Examples 1 to 6:

EXAMPLE 1

| | |
|---|---|
| TARGET MATERIAL: | $Na_2MnMo_2O_8$ |
| Starting materials: | $Na_2CO_3$ (0.57 g) |
| | $MnCO_3$ (0.89 g) |
| | $MoO_3$ (2.22 g) |
| Furnace Parameters: | Muffle furnace, Gas type (Ambient air) |
| | Ramp rate: 5° C./min; |
| | temperature: 650° C.; dwell time: 6 hours |

EXAMPLE 2

| | |
|---|---|
| TARGET MATERIAL: | $Na_2NiMo_2O_8$ |
| Starting materials: | $Na_2CO_3$ (0.75 g) |
| | NiO (0.53 g) |
| | $MoO_3$ (2.03 g) |
| Furnace Parameters: | Muffle furnace, Gas type (Ambient air) |
| | Ramp rate: 3° C./min; |
| | temperature: 650° C.; dwell time: 6 hours |

EXAMPLE 3

| | |
|---|---|
| TARGET MATERIAL: | $Na_2CoMo_2O_8$ |
| Starting materials: | $Na_2CO_3$ (0.75 g) |
| | $CoCO_3$ (0.84 g) |
| | $MoO_3$ (2.03 g) |
| Furnace Parameters: | Muffle furnace, Gas type (Ambient air) |
| | Ramp rate: 5° C./min; |
| | temperature: 650° C.; dwell time: 6 hours |

EXAMPLE 4a

| | |
|---|---|
| TARGET MATERIAL: | $Na_4Mn_3(PO_4)_2(P_2O_7)$ |
| Starting materials: | $Na_4P_2O_7$ (1.29 g) |
| | $MnCO_3$ (1.67 g) |
| | $NH_4H_2PO_4$ (1.11 g) |
| Furnace Parameters: | Muffle furnace, Gas type (Ambient air) |
| | Ramp rate: 3° C./min; |
| | temperature: 300° C.; dwell time: 6 hours |

EXAMPLE 4b

| | |
|---|---|
| TARGET MATERIAL: | $Na_4Mn_3(PO_4)_2(P_2O_7)$ |
| Starting materials: | $Na_4P_2O_7$ (1.29 g) |
| | $MnCO_3$ (1.67 g) |
| | $NH_4H_2PO_4$ (1.11 g) |
| Furnace Parameters: | Muffle furnace, Gas type (Ambient air) |
| | Conditions of Example 4a, followed by a |
| | ramp rate: 3° C./min; temperature: 500° C.; |
| | dwell time: 6 hours |

EXAMPLE 4c

| | |
|---|---|
| TARGET MATERIAL: | $Na_4Mn_3(PO_4)_2(P_2O_7)$ |
| Starting materials: | $Na_4P_2O_7$ (1.29 g) |
| | $MnCO_3$ (1.67 g) |
| | $NH_4H_2PO_4$ (1.11 g) |
| Furnace Parameters: | Muffle furnace, Gas type (Ambient air) |
| | Conditions of Example 4b, followed by a |
| | ramp rate: 3° C./min; temperature: 700° C.; |
| | dwell time: 6 hours |

EXAMPLE 5a

| | |
|---|---|
| TARGET MATERIAL: | $Na_4Co_3(PO_4)_2(P_2O_7)$ |
| Starting materials: | $Na_4P_2O_7$ (1.26 g) |
| | $CoCO_3$ (1.69 g) |
| | $NH_4H_2PO_4$ (1.09 g) |
| Furnace Parameters: | Muffle furnace, Gas type (Ambient air) |
| | Ramp rate: 3° C./min; |
| | temperature: 300° C.; dwell time: 6 hours |

EXAMPLE 5b

| | |
|---|---|
| TARGET MATERIAL: | $Na_4Co_3(PO_4)_2(P_2O_7)$ |
| Starting materials: | $Na_4P_2O_7$ (1.26 g) |
| | $CoCO_3$ (1.69 g) |
| | $NH_4H_2PO_4$ (1.09 g) |
| Furnace Parameters: | Muffle furnace, Gas type (Ambient air) |
| | Conditions of Example 5a followed by a |
| | ramp rate: 3° C./min; temperature: 500° C.; |
| | dwell time: 6 hours |

EXAMPLE 5c

| | |
|---|---|
| TARGET MATERIAL: | $Na_4CO_3(PO_4)_2(P_2O_7)$ |
| Starting materials: | $Na_4P_2O_7$ (1.26 g) |
| | $CoCO_3$ (1.69 g) |
| | $NH_4H_2PO_4$ (1.09 g) |
| Furnace Parameters: | Muffle furnace, Gas type (Ambient air) |
| | Conditions of Example 5b followed by a |
| | ramp rate: 3° C./min; temperature: 700° C.; |
| | dwell time: 6 hours |

EXAMPLE 6a

| | |
|---|---|
| TARGET MATERIAL: | $Na_4Ni_3(PO_4)_2(P_2O_7)$ |
| Starting materials: | $Na_4P_2O_7$ (1.26 g) |
| | $NiCO_3$ (1.69 g) |
| | $NH_4H_2PO_4$ (1.09 g) |
| Furnace Parameters: | Muffle furnace, Gas type (Ambient air) |
| | Ramp rate: 3° C./min; |
| | temperature: 300° C.; dwell time: 6 hours |

EXAMPLE 6b

| | |
|---|---|
| TARGET MATERIAL: | $Na_4Ni_3(PO_4)_2(P_2O_7)$ |
| Starting materials: | $Na_4P_2O_7$ (1.26 g) |
| | $NiCO_3$ (1.69 g) |
| | $NH_4H_2PO_4$ (1.09 g) |
| Furnace Parameters: | Muffle furnace Gas type (Ambient air) Conditions of Example 6a followed by a ramp rate: 3° C./min; temperature: 500° C.; dwell time: 6 hours |

EXAMPLE 6c

| | |
|---|---|
| TARGET MATERIAL: | $Na_4Ni_3(PO_4)_2(P_2O_7)$ |
| Starting materials: | $Na_4P_2O_7$ (1.26 g) |
| | $NiCO_3$ (1.69 g) |
| | $NH_4H_2PO_4$ (1.09 g) |
| Furnace Parameters: | Muffle furnace, Gas type (Ambient air) Conditions of Example 6b followed by a ramp rate: 3° C./min; temperature: 700° C.; dwell time: 6 hours |

EXAMPLE 7

| | |
|---|---|
| TARGET MATERIAL: | $Na_4Fe_3P_2O_7(PO_4)_2$ |
| Starting materials: | $Na_4P_2O_7$ (0.85 g) |
| | $FeC_2O_4 \cdot 2H_2O$ (1.73 g) |
| | $NH_4H_2PO_4$ (0.74 g) |
| Furnace Parameters: | Tube furnace, Gas type (argon) Ramp rate 5° C./min; temperature 300° C.; dwell time 6 hours, followed by 500° C. for 6 hours |

EXAMPLE 8

| | |
|---|---|
| TARGET MATERIAL: | $Na_7V_4(P_2O_7)_4PO_4$ |
| Starting materials: | $Na_2CO_3$ (1.61 g) |
| | $V_2O_5$ (1.57 g) |
| | $NH_4H_2PO_4$ (0.26 g) |
| | C (0.26 g) |
| Furnace Parameters: | Tube furnace, Gas type (nitrogen) Ramp rate 5° C./min; temperature 300° C.; dwell time 2 hours, followed by 800° C. for 36 hours, then 800° C. for 8 hours and 800° C. for 30 hours with intermittent grinding |

EXAMPLE 9

| | |
|---|---|
| TARGET MATERIAL: | $Na_7V_3(P_2O_7)_4$ |
| Starting materials: | $Na_2HPO_4$ (2.89 g) |
| | $Na_4P_2O_7$ (1.81 g) |
| | $V_2O_5$ (1.24 g) |
| | $NH_4H_2PO_4$ (2.34 g) |
| | C (0.20 g) |
| Furnace Parameters: | Tube furnace, Gas type (nitrogen) Ramp rate 5° C./min; temperature 300° C.; dwell time 4 hours, followed by 650° C. for 8 hours, then 750° C. for 8 hours with intermittent grinding |

The resulting product materials were analysed by X-ray diffraction techniques using a Siemens D5000 XRD machine to confirm that the desired target materials had been prepared and to establish the phase purity of the product material and to determine the types of impurities present. From this information it is possible to determine the unit cell lattice parameters.

The typical operating conditions used to obtain the XRD spectra illustrated in the figures are as follows:
Slits sizes: 1 mm, 1 mm, 0.1 mm
Range: $2\theta=5°-60°$
X-ray Wavelength=1.5418 Å (Angstroms) (Cu K$\alpha$)
Speed: 2 seconds/step
Increment: 0.015°
Results The target materials were tested in a lithium metal anode test electrochemical cell to determine their specific capacity and also to establish whether they have the potential to undergo charge and discharge cycles. A lithium metal anode test electrochemical cell containing the active material is constructed as follows:

Generic Procedure For Making A Lithium Metal Test Electrochemical Cell

The positive electrode is prepared by solvent-casting a slurry of the active material, conductive carbon, binder and solvent. The conductive carbon used is Super P (Timcal). PVdF co-polymer (e.g. Kynar Flex 2801, Elf Atochem Inc.) is used as the binder, and acetone is employed as the solvent. The slurry is then cast onto glass and a free-standing electrode film is formed as the solvent evaporates. The electrode film contains the following components, expressed in percent by weight: 80% active material, 8% Super P carbon, and 12% Kynar 2801 binder. Optionally, an aluminium current collector may be used to contact the positive electrode, or alternatively, metallic lithium on a copper current collector may be employed as the negative electrode. The electrolyte comprises one of the following: (i) a 1 M solution of $LiPF_6$ in ethylene carbonate (EC) and dimethyl carbonate (DMC) in a weight ratio of 2:1; (ii) a 1 M solution of $LiPF_6$ in ethylene carbonate (EC) and diethyl carbonate (DEC) in a weight ratio of 1:1; or (iii) a 1 M solution of $LiPF_6$ in propylene carbonate (PC). A glass fibre separator (Whatman, GF/A) or a porous polypropylene separator (e.g. Celgard 2400) wetted by the electrolyte is interposed between the positive and negative electrodes.

First Cycle Constant Current Data

Figure 4:
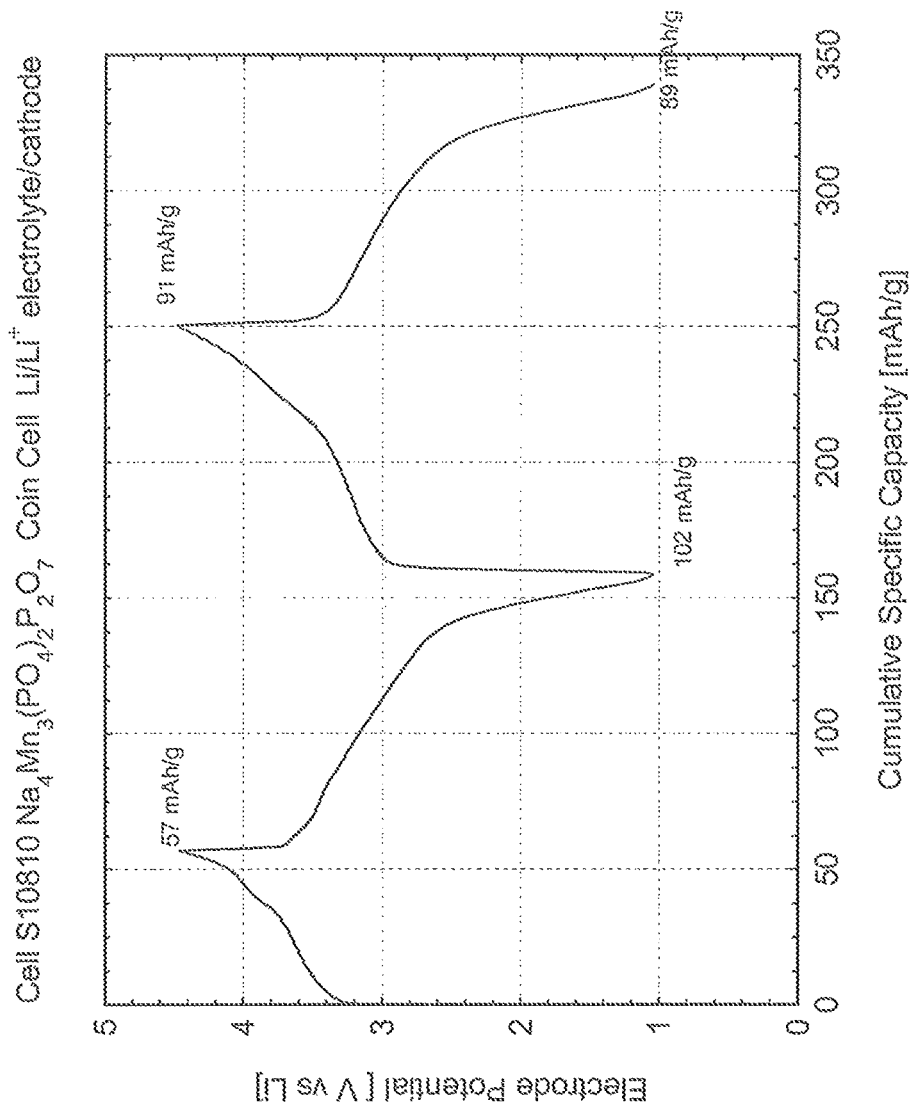
FIG. 4 shows the first cycle constant current data for an electrode according to the present invention comprising $Na_4Mn_3(PO_4)_2P_2O_7$ prepared according to Example 4c.
Figure 5:
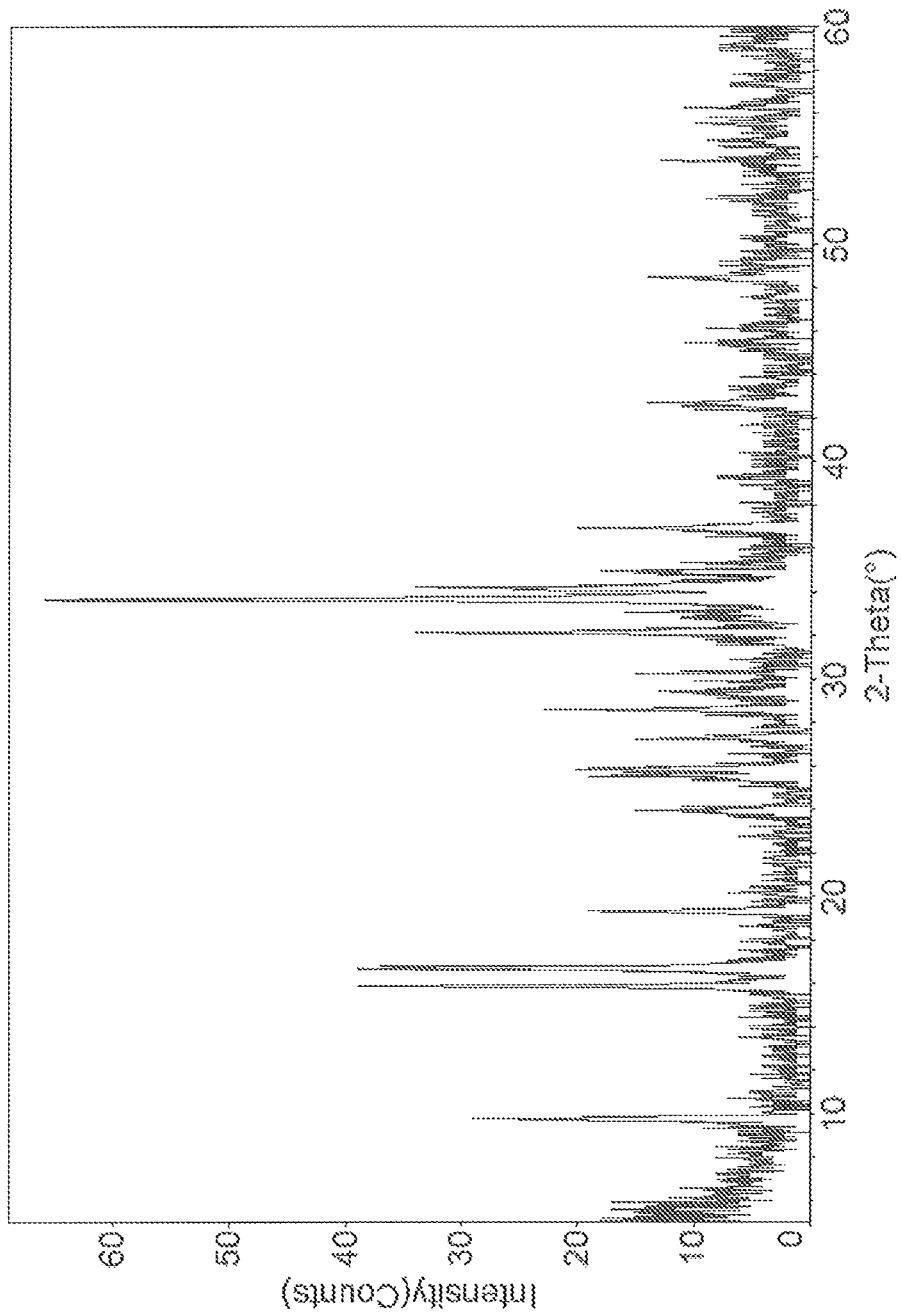
FIG. 5 is an XRD pattern for $Na_4Fe_3P_2O_7(PO_4)_2$ prepared according to Example 7.
Figure 6:
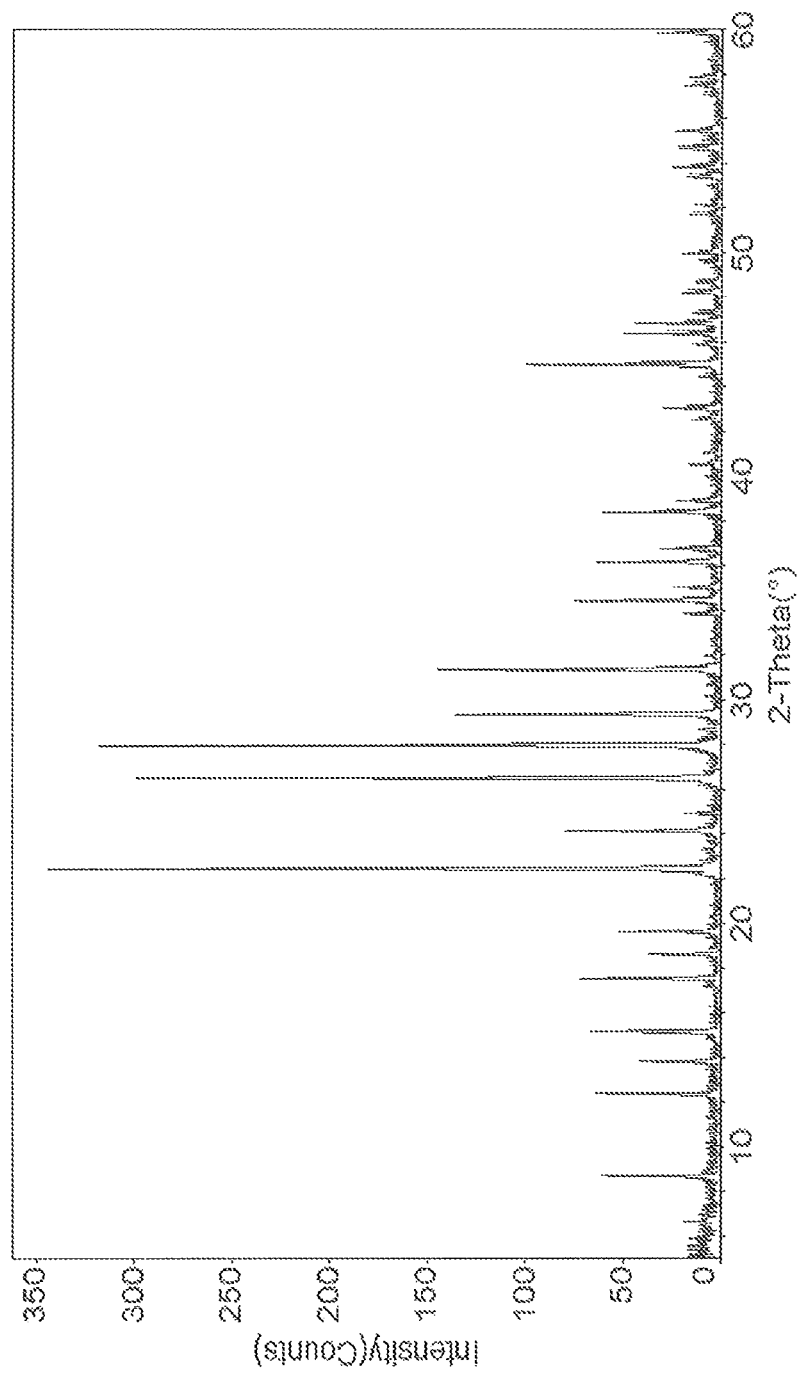
FIG. 6 is an XRD pattern for $Na_7V_4(P_2O_7)_4PO_4$ prepared according to Example 8.

FIG. 4 shows the first cycle constant current data for the $Na_4Mn_3(PO_4)_2P_2O_7$ active material (prepared in Example 4c). The Open Circuit Voltage (OCV) of the as-made cell was 3.22 V vs. Li. The constant current data were collected using a lithium metal counter electrode at a current density of 0.1 mA/cm$^2$, between voltage limits of 1.00 and 4.60 V. The testing was carried out at room temperature. It is assumed that sodium is extracted from the active material during the initial charging of the cell. A charge equivalent to a material specific capacity of 57 mAh/g is extracted from the cell.

It is expected from thermodynamic considerations that the sodium extracted from the $Na_4Mn_3(PO_4)_2P_2O_7$ material during the initial charging process, enters the electrolyte, and is displaced by being 'plated' onto the lithium metal anode (i.e. releasing more lithium into the electrolyte). Therefore, during the subsequent discharging of the cell, it is assumed that a mix of lithium and sodium is re-inserted into the material. The re-insertion process corresponds to 102 mAh/g; this indicates the reversibility of the extraction-insertion processes. The generally symmetrical nature of the charge-discharge curves shown in FIG. 4 further indicates the excellent reversibility of the system.

Figure 7:
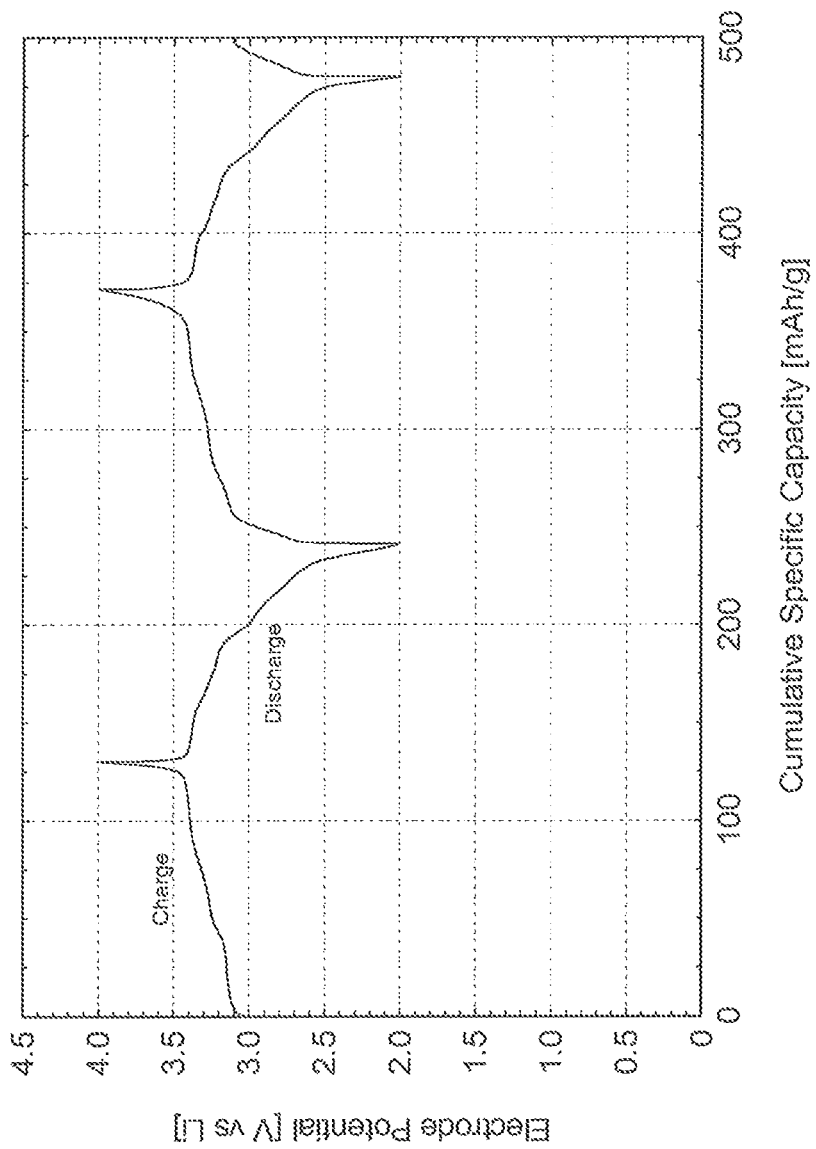
FIG. 7 shows the first cycle constant current data for the $Na_4Fe_3P_2O_7(PO_4)_2$ active material.

FIG. 7 shows the first cycle constant current data for the $Na_4Fe_3(PO_4)_2P_2O_7$ active material (prepared as in Example 7). The Open Circuit Voltage (OCV) of the as-made cell was 2.93 V vs. Li. The constant current data were collected using a lithium metal counter electrode at a current density of 0.04 mA cm$^2$, between voltage limits of 2.0 and 4.0 V vs. Li. The testing was carried out at room temperature. It is assumed that sodium is extracted from the active material during the initial charging of the cell. A charge equivalent to a material specific capacity of 130 mAh/g is extracted from the material.

It is expected from thermodynamic considerations that the sodium extracted from the $Na_4Fe_3(PO_4)_2P_2O_7$ material during the initial charging process, enters the electrolyte, and is displaced by being 'plated' onto the lithium metal anode (i.e. releasing more lithium into the electrolyte). Therefore, during the subsequent discharging of the cell, it is assumed that a mix of lithium and sodium is re-inserted into the material. The re-insertion process corresponds to 111 mAh/g; this indicates the reversibility of the extraction-insertion processes. The generally symmetrical nature of the charge-discharge curves shown in FIG. 7 further indicates the excellent reversibility of the material.

Figure 8:
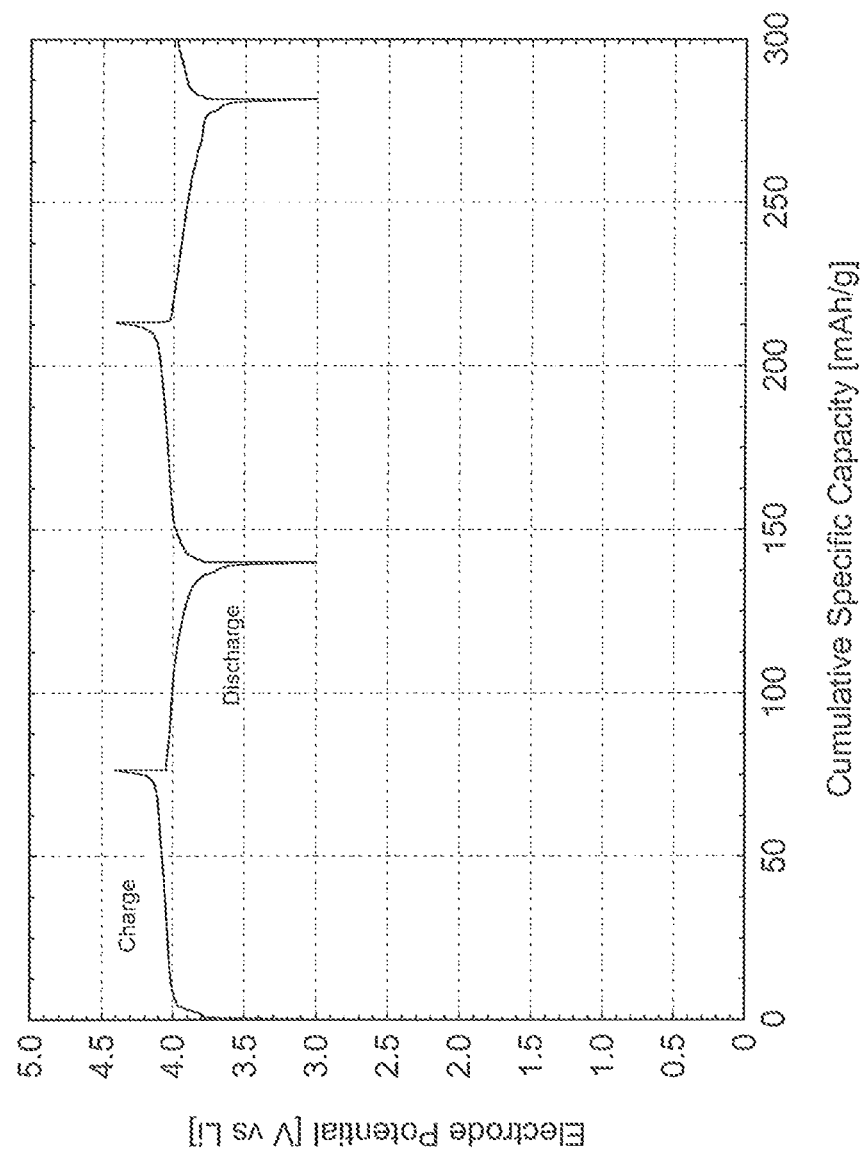
FIG. 8 shows the first cycle constant current data for the $Na_7V_4(P_2O_7)_4PO_4$ active material.
Figure 9:
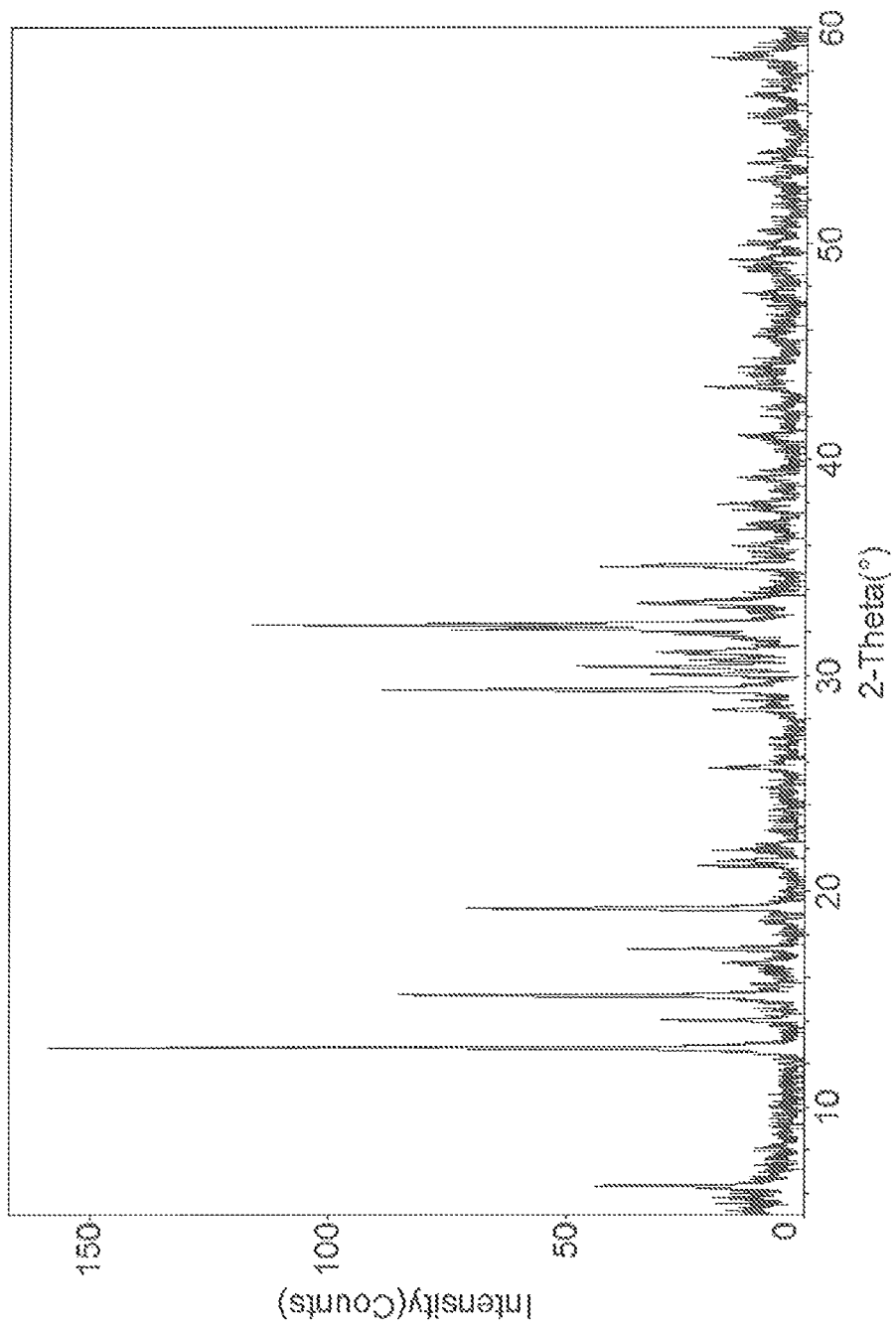
FIG. 9 is an XRD pattern for $Na_7V_3(P_2O_7)_4$ prepared according to Example 9.

FIG. 8 shows the first cycle constant current data for the $Na_7V4(P_2O_7)_4PO_4$ active material (prepared as in Example 8). The Open Circuit Voltage (OCV) of the as-made cell was 3.20 V vs. Li. The constant current data were collected using a lithium metal counter electrode at a current density of 0.04 mA/cm$^2$, between voltage limits of 3.0 and 4.4 V vs. Li. The testing was carried out at room temperature. It is assumed that sodium is extracted from the active material during the initial charging of the cell. A charge equivalent to a material specific capacity of 76 mAh/g is extracted from the material.

It is expected from thermodynamic considerations that the sodium extracted from the $Na_7V4(P_2O_7)_4PO_4$ material during the initial charging process, enters the electrolyte, and is displaced by being 'plated' onto the lithium metal anode (i.e. releasing more lithium into the electrolyte). Therefore, during the subsequent discharging of the cell, it is assumed that a mix of lithium and sodium is re-inserted into the material. The re-insertion process corresponds to 64 mAh/g; this indicates the reversibility of the extraction-insertion processes. The generally symmetrical nature of the charge-discharge curves shown in FIG. 8 further indicates the excellent reversibility of the material.

Figure 10:
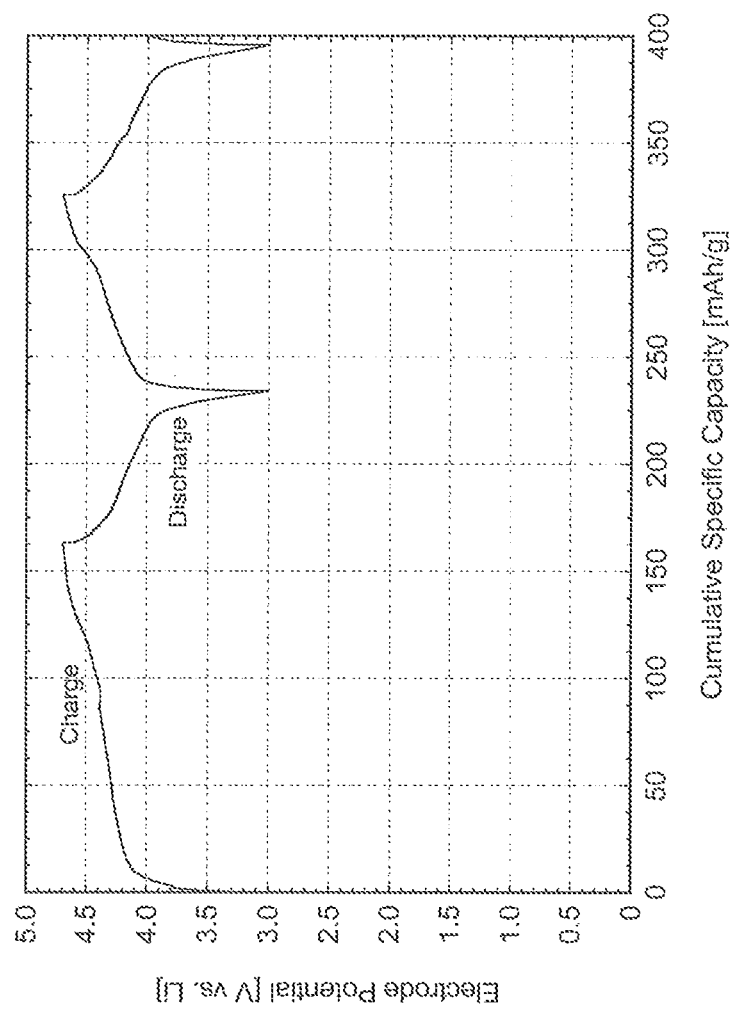
FIG. 10 shows the first cycle constant current data for the $Na_7V_3(P_2O_7)_4$ active material.

FIG. 10 shows the first cycle constant current data for the $Na_7V_3(P_2O_7)_4$ active material (prepared as in Example 9). The Open Circuit Voltage (OCV) of the as-made cell was 3.15 V vs. Li. The constant current data were collected using a lithium metal counter electrode at a current density of 0.02 mA/cm$^2$, between voltage limits of 3.0 and 4.7 V vs. Li. The testing was carried out at room temperature. It is assumed that sodium is extracted from the active material during the initial charging of the cell. A charge equivalent to a material specific capacity of 163 mAh/g is extracted from the material.

It is expected from thermodynamic considerations that the sodium extracted from the $Na_7V_3(P_2O_7)_4$ material during the initial charging process, enters the electrolyte, and is displaced by being 'plated' onto the lithium metal anode (i.e. releasing more lithium into the electrolyte). Therefore, during the subsequent discharging of the cell, it is assumed that a mix of lithium and sodium is re-inserted into the material. The re-insertion process corresponds to 71 mAh/g; this indicates the reversibility of the extraction-insertion processes. The generally symmetrical nature of the charge-discharge curves shown in FIG. 10 further indicates the reasonable reversibility of the material.

What is claimed is:

1. An electrode, wherein the electrode comprises:
   an active material capable of reversibly storing sodium ions, wherein the active material comprises:
   $Na_aX_bM_cM'_d$(condensed polyanion)$_e$(anion)$_f$;
   where X is one or more of Na$^+$, Li$^+$ and K$^+$;
   M is one or more transition metals;
   M' is one or more non-transition metals;
   where a>b; c>0; d>0; e>1 and f>0 and where the condensed polyanion comprises one or more phosphorus moieties selected from $P_2O_7^{4-}$, $P_3O_9^{5-}$ and $P_4O_{11}^{6-}$; and
   a binder configured to bind at least a portion of the active material to form the electrode.

2. The electrode according to claim 1, wherein:
   the transition metal is selected from one or more of titanium, vanadium, niobium, tantalum, hafnium, chromium, molybdenum, tungsten, manganese, iron, osmium, cobalt, nickel, palladium, platinum, copper, silver, gold, zinc and cadmium;
   the optional non-transition metal is selected from one or more of magnesium, calcium, beryllium, strontium, barium, aluminium and boron; and the anion is selected from one or more of borate, nitrate, silicate, arsenate, sulfate, vanadate, niobate, molybdate, tungstate, phosphate, carbonate, fluorophosphate, fluorosulfate, halide and hydroxide.

3. The electrode according to claim 1, wherein the active material is $Na_aX_bM_cM'_dP_2O_7(PO_4)_2$, where a>b; a+b=4; c+d=3, and each of the metals represented by M and M' has an oxidation state of +2.

4. The electrode according to claim 1, wherein the active material comprises $Na_aX_bM_cM'_dP_2O_7(PO_4)_2$, where a>b; a+b=4; c+d=3; and wherein $M_c$ comprises iron as Fe$^{2+}$.

5. The electrode according to claim 1, wherein the active compound comprises $Na_aX_bM_cM'_d(P_2O_7)_2(PO_4)_2$, where a>b; a+b=4; c+d=5; and wherein $M_c$ comprises iron as Fe$^{2+}$.

6. The electrode according to claim 1 wherein one or more of the condensed polyanions is a hetero-ligand condensed polyanion.

7. The electrode according to claim 6, wherein one or more ligands of the hetero-ligand condensed polyanion are halide-containing moieties.

8. An energy storage device comprising the electrode according to claim 1.

9. An electrochemical cell, comprising the energy storage device according to claim 8, wherein the electrochemical cell is a sodium ion cell, a sodium metal cell, a non-aqueous ion cell, or an aqueous ion cell.

10. A rechargeable battery comprising the electrode according to claim 1.

11. An electrochemical device comprising the electrode according to claim 1.

12. An electrochromic device comprising the electrode according to claim 1.

13. The electrode according to claim 1, wherein the active material is $Na_aX_b M_cM'_d(P_2O_7)_4(PO_4)$, where a>b; a+b=7; c+d=4, and each of the metals represented by M and M' has an oxidation state of +3.

14. The electrode according to claim 1, wherein the active material is $Na_aX_bM_cM'_d(P_2O_7)_2(PO_4)_2$, where a>b; a+b=4; c+d=5 and each of the metals represented by M and M' has an oxidation state of +2.

15. The electrode according to claim 1, wherein the active material is $Na_aX_bM_cM'_dP_2O_7(PO_4)_2$, where $a>b$; $a+b=4$; $c+d=3$; and wherein $M_c$ comprises one or more transition metals.

16. The electrode according to claim 1, wherein the active material is $Na_4Mn_2F_6(P_2O_7)$.

17. The electrode according to claim 2, wherein the non-transition metal is selected from beryllium and boron, and wherein $d>0$.

* * * * *